June 9, 1931. A. W. NELSON ET AL 1,809,060
HANDLE ATTACHMENT FOR COOKING UTENSILS
Filed Aug. 15, 1929
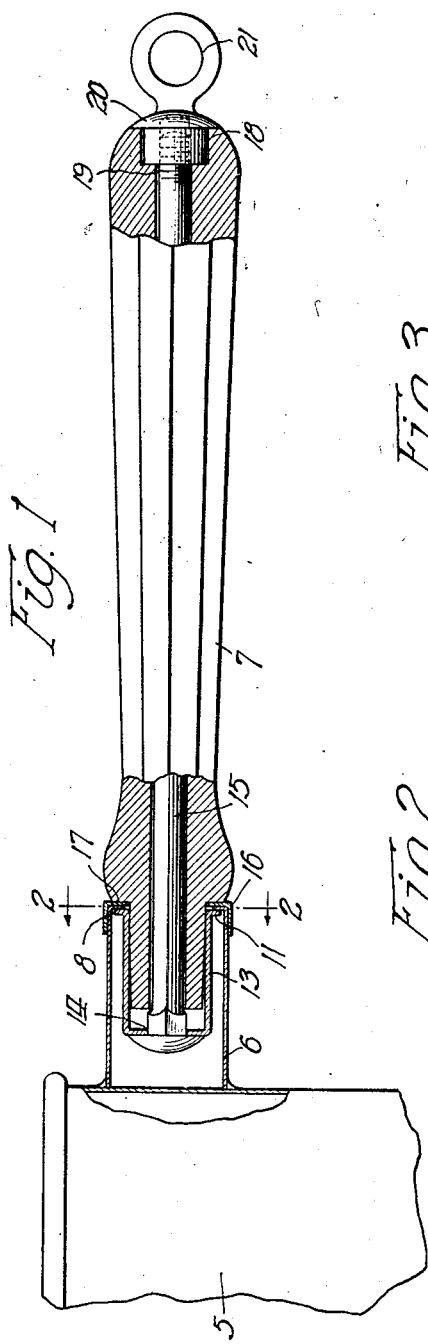
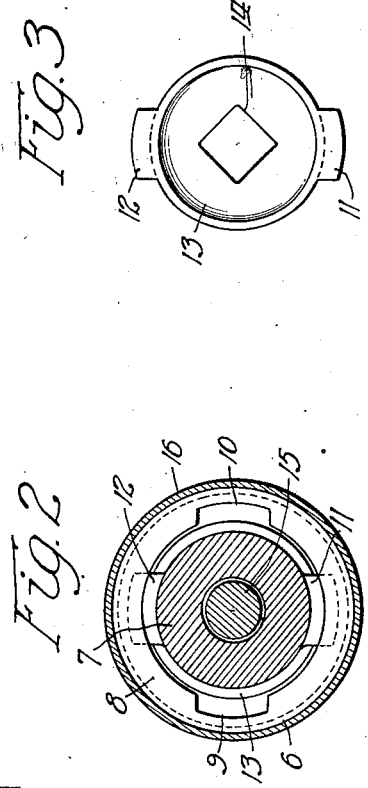
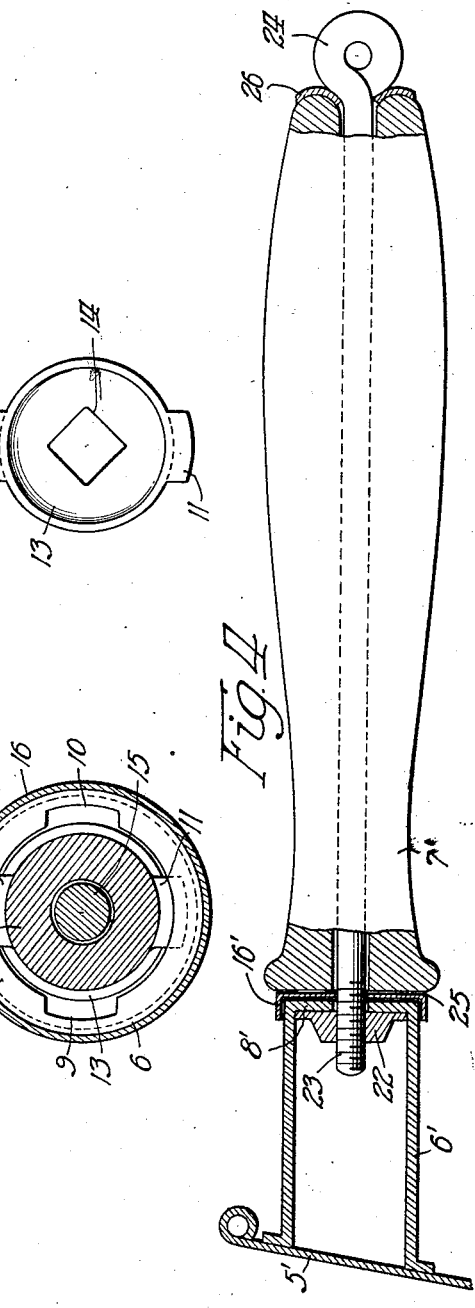
Inventors
Andrew W. Nelson
Wilbur Topping Patented June 9, 1931

1,809,060

UNITED STATES PATENT OFFICE

ANDREW W. NELSON AND WILBUR TOPPING, OF TERRE HAUTE, INDIANA, ASSIGNORS TO COLUMBIAN ENAMELING & STAMPING COMPANY, OF TERRE HAUTE, INDIANA, A CORPORATION OF INDIANA

HANDLE ATTACHMENT FOR COOKING UTENSILS

Application filed August 15, 1929. Serial No. 386,073.

Our invention relates to means for attaching handles to cooking vessels and has for its principal object the provision of novel means whereby a handle of relatively poor heat conducting qualities such as a wooden handle or one of some non-metallic composition may be attached to a metal vessel in such manner as to prevent the handle from becoming hot due to conduction of heat from the vessel.

It is also a purpose of this invention to provide a handle attachment of this character which may be applied to the vessels after they are finished without danger of marring the surface thereof either in applying the handle or in use of the vessel thereafter by reason of strains placed on the connection between the vessel and handle.

Other objects and advantages of the invention will appear as the description proceeds in connection with the accompanying drawings. It is obvious, however, that various modifications may be made without departing from the scope of the invention, and it is to be understood that the drawings and description are illustrative only and are not to be taken as limiting the invention beyond the scope of the claims.

In the drawings—

Fig. 1 is a side view partly in section showing one method of attaching the handle to a cooking vessel;

Fig. 2 is a section on the line 2—2 of Fig. 1;

Fig. 3 is an end view of one of the attaching elements; and

Fig. 4 is a side view partly in section of a slightly different form of the invention.

Referring now in detail to the drawings, the vessel is indicated at 5, this vessel being a sheet metal vessel which may be finished in any suitable manner such as by highly polishing or applying a protecting coating thereto. This vessel 5 has attached thereto a laterally extending tubular member 6 of rigid metal which member may be welded or otherwise suitably secured to the vessel prior to applying the finished surface thereto.

After the member 6 is secured and the vessel surface finished in the proper manner, the vessel is then ready for attachment of the handle 7. The member 6, as shown, has at its outer end an inturned flange 8 formed integral thereon which flange has opposed cut away portions 9 and 10 adapted to receive the gears 11 and 12 of the connecting member 13. This member 13 is substantially cup-shaped and is provided in the base with a polygonal opening 14 through which the headed bolt 15 extends.

Now in assembling the device, the bolt is placed within the member 13, as shown in Fig. 1, and the handle 7 which is provided with a longitudinal bore for the bolt 15 is extended into the member 13 with a suitable finishing collar 16 interposed between the shoulder 17 of the handle and the member 13. The member 13 is then inserted in the tubular member 6 with the ears 11 and 12 aligning with the cut away portions 9 and 10, and, after the member 13 is wholly within the tubular member 6, it is turned by means of the bolt 15 to bring the ears 11 and 12 into the position shown in Fig. 2 which effectively prevents the member 13 from being removed from the member 6.

Handle 7, it will be noted, is recessed at its outer end at 18 and the bolt 15 is threaded at 19 to receive the clamping nut 20 which is provided with a suitable ring 21 for the purpose of suspending the vessel. When the handle has been mounted in the fashion previously described, the member 20 is screwed down upon the bolt 15 so as to force the handle tightly into the member 13 and clamp the flange 8 between the ears 11 and 12 and the collar 16. This collar is in turn clamped against the shoulder 17 on the handle 7. In this way a very rigid connection is obtained and the collar 16 closes the end of the tubular member 6 so as to prevent the showing of any unfinished sharp edges which might become marred and at the same time the collar 16 serves to reenforce the joint and prevent buckling of the member 6 under the weight of the vessel.

Now in Fig. 4 a slightly different form of the invention is shown in which the vessel 5' has attached thereto a member 6' which is very similar to the member 6 in Fig. 1 with the exception that the flange 8′ of this member extends inwardly to provide only a small opening into the interior of the member 6′. The handle 7′ may be made of the same material as the one previously described.

The attaching means, however, with the exception of collar 16′ are somewhat different. In this case a screw threaded nut 22 is secured to the interior face of the flange 8′ preferably by welding so that this nut cannot turn within the member 6′. The bolt 23 having the ring 24 at its outer end extends through the hollow bore of the handle 7′ and screw threads into the nut 22 so as to clamp the collar 16′ and the flange 8′ between the nut 22 and the end 25 of handle 7′. The end of the handle is protected by a suitable concave washer 26.

From the above description, it will be seen that means have been provided whereby a suitable handle of material such as wood or composition may be firmly attached to a sheet metal vessel or the like after the finishing process is completed without danger of marring the vessel and with a joint that places the minimum amount of strain upon the weaker portions of the handle while at the same time provides a rigid connection.

Having thus described our invention, what we claim as new and desire to secure by Letters Patent is:

1. A handle attachment for culinary vessels and the like comprising a tubular member fixed to the outer wall of the vessel, said member having its outer end provided with an inturned holding flange, a handle, a securing member projecting from said handle into the interior of said tubular member, a ferrule interposed between the end of said handle and said flange and encircling the adjacent portion of said tubular member, and means in said tubular member with which said securing member engages to clamp said handle and ferrule to said flange.

2. A handle attachment for culinary vessels and the like comprising a tubular member fixed to the outer wall of the vessel, said member having its outer end provided with an inturned holding flange, a handle, a securing member projecting from said handle into the interior of said tubular member, a ferrule interposed between the end of said handle and said flange and encircling the adjacent portion of said tubular member, and means in said tubular member with which said securing member engages to clamp said handle and ferrule to said flange, said securing member projecting through said handle and having means at its outer end for hanging said vessel upon a support.

3. A handle attachment for culinary vessels and the like comprising a tubular member fixed to the outer wall of the vessel, said member having its outer end provided with an inturned holding flange, a handle, a securing member projecting from said handle into the interior of said tubular member, and means within said tubular member having portions cooperating with said flange to hold said means therein in one position and release the said means for removal in another position thereof, said means cooperating with said securing member to clamp the handle member to the tubular member.

In witness whereof, we hereunto subscribe our names this 2nd day of Aug. A. D., 1929.

ANDREW W. NELSON.
WILBUR TOPPING.